(12) United States Patent
Hadden et al.

(10) Patent No.: US 8,321,947 B2
(45) Date of Patent: Nov. 27, 2012

(54) METHOD AND SYSTEM FOR DYNAMICALLY GENERATING A WATERMARKED DOCUMENT DURING A PRINTING OR DISPLAY OPERATION

(75) Inventors: Allen D. Hadden, Marlborough, MA (US); Christopher A. Hébert, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 1902 days.

(21) Appl. No.: 11/300,954

(22) Filed: Dec. 15, 2005

(65) Prior Publication Data
US 2007/0143603 A1 Jun. 21, 2007

(51) Int. Cl.
*G06F 21/24* (2006.01)
(52) U.S. Cl. ............ 726/26; 726/27; 713/176; 382/100
(58) Field of Classification Search ........................ None
See application file for complete search history.

(56) References Cited

U.S. PATENT DOCUMENTS

| | | | |
|---|---|---|---|
| 5,488,664 A | 1/1996 | Shamir | |
| 6,289,450 B1 | 9/2001 | Pensak et al. | |
| 6,298,446 B1 * | 10/2001 | Schreiber et al. | 726/27 |
| 6,339,825 B2 | 1/2002 | Pensak et al. | |
| 6,389,151 B1 | 5/2002 | Carr et al. | |
| 6,718,334 B1 * | 4/2004 | Han | 1/1 |
| 6,970,259 B1 | 11/2005 | Lunt et al. | |
| 2004/0240703 A1 | 12/2004 | Cohen et al. | |

OTHER PUBLICATIONS

Stewart, Adding dynamic stamps to PDFs when printing, Jan. 2005.*
Stallings, "Operating Systems: Internals and Design Principles", 1998, Prentice Hall, 3$^{rd}$ Edition, pp. 501-507.*
Copyright by Authentica Security Technologies Incorporated, PageVault Administrator Users Guide, Modified Jun. 1999.
EMC Corporation, EMC Documentum Information Rights Management (IRM), White Paper, Oct. 2009.
EMC Corporation, How to Use Your IRM Client for Microsoft Office, V4.7.0, Mar. 2010.

* cited by examiner

*Primary Examiner* — Minh Dinh
(74) *Attorney, Agent, or Firm* — Dergosits & Noah LLP; Todd A. Noah

(57) ABSTRACT

A dynamic watermarking capability is implemented in an enterprise rights management (ERM) or similar system that comprises a central server to which end user client machines are connectable. The central server has a database in which watermark definitions created by authorized entities are centrally stored. An end user client machine is provided with a client component that typically includes wrapper code, and watermarking rendering code. The wrapper and rendering code are instantiated when a given calling application is started, or when the application initiates a given rendering function such as a print or display operation. When the calling application begins the rendering operation, the wrapper code intercepts a given rendering function call, connects to the central server and then retrieves a watermark definition. Alternatively, the watermark definition is retrieved when a document to be rendered is first accessed on the client machine. The watermark definition is then applied by the watermark rendering code, preferably using local rendering resources.

21 Claims, 4 Drawing Sheets

Figure 1

```
# Options
begin_options
Version (1)
TopMargin (12)
BottomMargin (12)
LeftMargin (0)
RightMargin (0)
end_options

# --      Item --
begin_message
Name (Left Header)
StartPage (0)
EndPage (-1)
Size (12)
Color (0)
Text (%x, %X)
Position (top)
Justification (left)
Underlay (no)
end_message
```

```
# --       Item --
begin_message
Name (Watermark)
StartPage (0)
EndPage (-1)
Size (36)
Color (50)
Text (Confidential)
Position (diag-topleft)
Justification (left)
Underlay (yes)
end_message
```

Figure 3

| Parameter | Required | Definition | Values | Default |
|---|---|---|---|---|
| Name | yes | identifies the wm item | text | New Item |
| StartPage | yes | first page to wm | numeric or -1 for last page | 1 |
| EndPage | no | last page to wm | numeric or -1 for last page | -1 |
| Size | no | point size of message text | numeric | 12 |
| Color | no | color of message text | 0 for black, 100 for white, 1-99 for shades of gray | 0 |
| Text | yes | information to wm on the PDF pages | text, variables | none |
| Position | no | page location where text will be wm | top, bottom, diag-topleft, diag-bottomleft | top |
| Justification | no | how text will be aligned | left, center, right | center |
| underlay | no | whether text will be wm under (underlay) or over (overlay) PDF text | yes to underlay or no to overlay | yes |

Figure 4

| Variable | Format | Example |
|---|---|---|
| %A | full weekday name | Friday |
| %a | abbreviated weekday name | Fri |
| %B | full month name | October |
| %b | abbreviated month name | Oct |
| %c | local date and time | 10/01/98 05:00:00 |
| %d | day of month | 15 |
| %G | total number of pages | 20 |
| %g | number with which to begin page numbering | 2 |
| %H | hours, 00-23 | 13 |
| %I | hour, 01-12 | 01 |
| %i(<info field name>) | PDF info dictionary value: Author, Title, Subject, Keyword, Creator | Sample.pdf, Jane Smith, Security |
| %j | day of the year, 001-366 | 099 |
| %M | minutes, 00-59 | 25 |
| %m | month, 1-12 | 10 |
| %N | PDF filename | Sample.pdf |
| %P | full PDF pathname (including filename) | c:/MyDocuments/Sample.pdf |
| %p | local equivalent of AM or PM | PM |
| %S | seconds, 00-61 | 10 |
| %U | week of the year, 01-53 where Sunday is the first day of the week | 36 |
| %W | numeric week of the year, 00-53 where Monday is the first day of the week | 36 |
| %w | numeric weekday, 0-6 where Sunday is 0 | 5 |
| %X | local time representation | 05:35:10 |
| %x | local date representation | 10/02/98 |
| %Y | year with century | 1998 |
| %y | year without century, 00-99 | 98 |
| %% | % | % |

Figure 5

METHOD AND SYSTEM FOR DYNAMICALLY GENERATING A WATERMARKED DOCUMENT DURING A PRINTING OR DISPLAY OPERATION

COPYRIGHT STATEMENT

This application includes subject matter that is protected by copyright. All rights are reserved.

BACKGROUND OF THE INVENTION

1. Technical Field

The present invention relates generally to document protection using digital watermarking techniques.

2. Background of the Related Art

Digital watermarking is a well-defined art. The following are representative patents that describe watermarking techniques in the context of document or image printing.

U.S. Pat. No. 6,970,259 describes a print management system that implements a policy to determine a protection level for a document to be printed. The document is printed using watermarks, glyphs, and digital signatures, which are appropriate to the level of protection determined by the policy. A set of printers are managed by a print management system. Each printer can provide a range of protection technologies. The policy determines the protection technologies for the document to be printed. The print management system routes the print job to a printer that can apply the appropriate protections and sets the appropriate parameters in the printer. Copy evidence that can establish that a document is a forgery and/or tracing information that identifies the custodian of the document and restrictions on copying of the document and use of the information in the document are included in the watermark that is printed on the document. A document can be verified as an original or established as a forgery by inspecting the copy evidence and/or tracing information in the watermark.

U.S. Pat. No. 5,488,664 describes a method and device for protecting visual information against unauthorized access and modification using a printed cryptographic watermark includes printing a first array of shapes on a first sheet of material to be protected and printing a second array of shapes on a second sheet of material, which is transparent so as to form a developer for developing a watermark encoded in a combination of the first and second arrays of shapes. The watermark is encoded by preparing each array using black and white pixels.

U.S. Pat. No. 6,389,151 describes a document validating system. Documents are produced by beginning with a template that defines the placements of elements on the document and the interrelationships between hidden and visual information on the document. The template specifies the placement of elements such as images, photographs, and text and it also specifies the interrelationship between information that is visually perceptible to a user of the document and information that is hidden by means of digital watermarks. Different hidden digital watermark data is included in multiple elements of the document. The watermarks in the different graphic elements of the document are correlated to each other and correlated to the visual material on the document. The system also includes a physical characteristic reader for automatically reading a physical characteristic of a person presenting the document and multiple hidden digital watermarks from different elements of said document, and a comparator for comparing the output of the physical characteristic reader with information stored in the hidden digital watermarks.

In addition, software applications such as Microsoft Word provide a document author with the capability of defining a watermark prior to creating a document, as well as defining how the watermark should be "applied" to a given document.

While these prior art techniques provide generally useful solutions, they require that the watermark to be created and the manner in which it is to be applied to be predetermined. They do not afford an authorized entity the ability to create a custom watermark in a centralized manner that can then be applied dynamically during a given rendering operation.

The present invention addresses this need in the art.

BRIEF SUMMARY OF THE INVENTION

It is an object of the present invention to enable a calling application running on a client machine to securely receive centrally-defined watermark definition data that is then used locally to render a watermark, preferably during a given document printing or display operation.

In a representative embodiment, a dynamic watermarking capability is implemented in an enterprise rights management (ERM) or similar system that comprises a central server to which end user client machines are connectable. The central server has a database in which watermark definitions created by authorized entities are centrally stored. An end user client machine is provided with a client component that typically includes wrapper code, and watermarking rendering code. The wrapper and rendering code are instantiated when a given calling application is started, or when the application initiates a given rendering function such as a print or display operation. When the calling application begins the rendering operation, the wrapper code intercepts a given rendering function call, connects to the central server and then retrieves a watermark definition. The watermark definition is then applied by the watermark rendering code, preferably using local rendering resources. In the alternative, the watermark definition is retrieved by the client component prior to the actual rendering operation, e.g., when a document to be printed or displayed is first opened by an application, which typically occurs when the ERM system provides the application with a decryption key or the like. In this alternative embodiment, the watermark definition may be provided to the client machine at the same time (or along with) the decryption key used to enable access to the document.

Preferably, the wrapper code hooks into one or more calling application graphic device interface (GDI) function calls to securely retrieve centrally-defined watermark definition data that is then used locally to render an "underlay" or "overlay" watermark.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 1 is a block diagram of the various components that provide a dynamic watermarking function according to the present invention;

FIG. 3 illustrates a representative watermark definition stored in the watermarking server;

FIG. 4 illustrates a table including a set of parameters that may be used to create a message block for a piece of information that can be watermarked on one or more pages using the watermarking function;

FIG. 5 illustrates a table including a set of watermark variables and their permitted values.

DETAILED DESCRIPTION OF AN ILLUSTRATIVE EMBODIMENT

Figure 2:
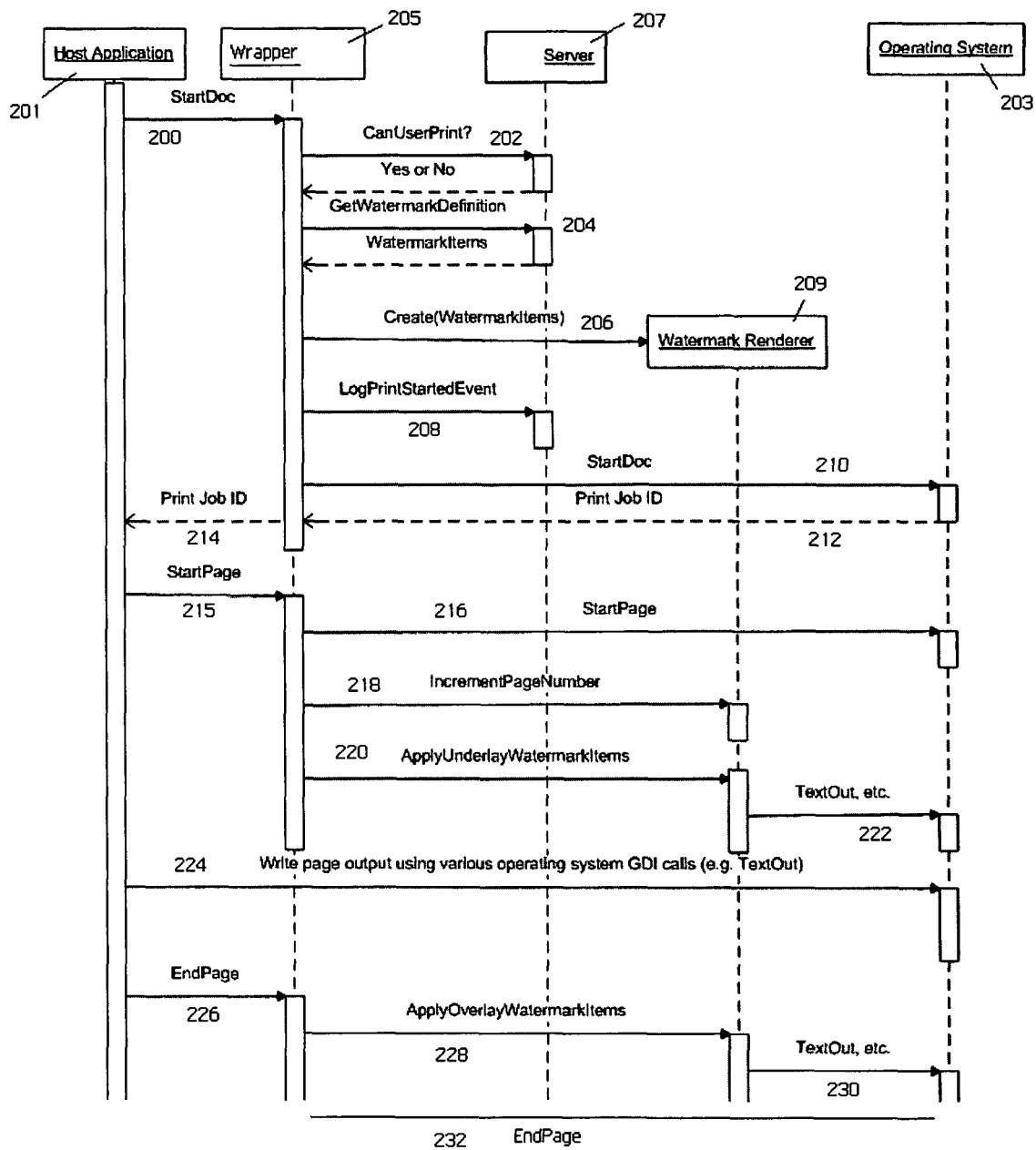
FIG. 2 is a process flow diagram illustrating how a dynamic watermark is generated according to one embodiment of the invention.

The present invention enables a digital watermark to be defined centrally in a policy-based manner and then applied at an enterprise workstation "on-the-fly" (i.e. dynamically) as a document is being rendered (e.g., printed, displayed, or the like), e.g., by operating system resources. For illustrative purposes only, the watermark rendering aspect of the invention is described in the context of a workstation having a Microsoft® Windows® operating system platform such as Windows XP. The present invention, however, is described in this context by way of example only; the rendering aspect of the dynamic watermarking technique may be implemented in any operating system including, without limitation, UNIX, Linux, OS/X, or the like. A representative machine or data processing system comprises a processor, an operating system, a set of input/output devices such as a display, a printer, or the like. The data processing system may be a standalone machine or connected to a network, such as a LAN, a WAN, the Internet, an intranet, or the like. The data processing system is assumed to execute a host or calling application, such as Microsoft Word, Excel, or the like, from which a document is to be printed or displayed (more generally, rendered) by a rendering device such as a printer or video display. It is also assumed that a watermark "definition" is created and stored on a separate machine, typically a server, such as a dedicated watermarking server (or as a server process). The watermarking server may be a standalone machine or associated with another type of server. Thus, for example, in one embodiment the watermarking server is a server process that executes in association with a digital rights management (DRM) solution such as Authentica® Secure Documents™ platform. That platform provides an enterprise rights management solution that protects information that is actively being revised or must otherwise remain in a native (e.g., Microsoft Office) format. Information is encrypted and persistently protected even while it is being accessed. In the Authentica system, a policy server enables a system administrator or other content owners to change and securely enforce user permissions (view, copy, forward, print or edit) and recall documents after they have been distributed. To access a protected document (which may be of any type) in such a system, the policy server provides a calling application plug-in with a decryption key and a policy that are then applied at the application to enable access to and use of a protected document. Further details regarding an enterprise rights management solution of this type is described in commonly-owned U.S. Pat. No. 6,289,450, the disclosure of which is incorporated herein by reference.

According to one advantage of the present invention, an enterprise rights management server (such as a policy server on which centralized document policies are created and enforced) is augmented with a watermarking process to facilitate policy-based watermarking. This enables an enterprise administrator or other permitted entity to centrally apply a printed or visual watermark on documents, e.g., to communicate data classification and deter unauthorized forwarding and copying by recipients. In one embodiment, as the rights management server provides a client application plug-in with a decryption key and policy to enable access to and use of a protected document, that server (or some process therein or associated therewith) can also provide a watermark definition to be applied to that document.

Thus, the dynamic watermarking function of the present invention preferably is implemented using a set of components, as illustrated in FIG. 1. In a typical scenario, a server 100 executes a server component 102 of the invention, while a data processing machine 104 executes a client component 106. The server component 102 and client component preferably communicate over a secure link 105, e.g., via SSL, or TLS, or some other proprietary protocol. As will be seen, the information communicated from the server component to the client component is sometimes referred to as a "watermark definition." This data is used by the client to create a watermark "on-the-fly" as a given rendering operation takes place on the data processing machine. If a lesser degree of security can be tolerated, the client component 106 may communicate with the server as a Web service or in any other non-secure or semi-secure manner. Typically, however, it will be desired to have watermark data (e.g., the watermark definition) created and stored in the server and available to the client component on an as-needed basis only. This is sometimes referred to herein as a policy-based watermarking scheme. In a typical use case, an administrator defines a watermark centrally and associates a use policy therewith. When the policy is triggered, the watermark data is transmitted from the server component to the client component only when required (e.g.,. when a protected document is opened, or as a protected document is about to be rendered), and that watermark data preferably is retained in system memory (instead of stored on disk) at the machine 104. As will be described in more detail below, preferably the server 100 also has or is associated with a database 103 in which the watermark data (a set of watermark definitions) is stored. In one embodiment, the data processing system also includes a graphical user or command line interface 107 that provides an administrator with the ability to design custom watermarks for use, for example, by authorized or permitted users, and to associate a given policy defining use conditions.

As will be seen, the client component 106 generally has two functional modules, a wrapper component 108, and a watermark rendering engine 110. In operation, it is assumed that a host (or "calling") application loads the client component 106 of the present invention when that application starts up or initiates a rendering (e.g., a print, a display) operation. Upon loading, the client component is instantiated and hooks into one or more application programming interface (API) rendering (e.g., print or display) functions. This hooking function enables the client component to intercept various function calls generated to the operating system by the calling application, and to take various actions thereafter, namely, to securely retrieve information from the watermarking server from which the watermark is then created and rendered. As will be seen, these actions are carried out transparently to the calling application, which is not aware that the client component has taken over the printing or display process.

By way of brief background, the Microsoft Windows operating system uses a graphics device interface (GDI) to enable applications to use graphics and formatted text on both a printer as well as a video display. Thus, Windows-based applications do not access graphics hardware directly; rather, the device interface typically interacts with device drivers on behalf of the calling application. The GDI print functions in Windows include, for example, functions such as CreateDC( ), StartDoc( ), StartPage( ), EndPage( ) and End-Doc( ). The CreateDC( ) function acquires a device context that can be used to draw to a printer device. The StartDoc( ) function starts a print job. The EndDoc( ) function ends a print job. The StartPage( ) function prepares the printer driver to accept data. The EndPage( ) function notifies the printer device that the application has finished writing to a page. This latter function is typically used to direct the device driver to advance to a new page. Different GDI functions are used to render information on a video display. In particular, the operating system notifies an application that portions of its display area need to be drawn, typically by sending the application a WM_PAINT notification message. The application typically responds to the WM_PAINT notification by calling GetDC( ) or GetDCEx( ) GDI function acquire a device context that can be used to draw to the screen. After drawing is complete, the application calls the ReleaseDC( ) function.

Thus, in both printing and video display, a calling application creates or acquires a device context and uses a set of rendering functions to render the desired content. According to the present invention, this rendering process is enhanced through the inclusion of a watermark, which is created, preferably on-the-fly, from a watermark definition that is securely retrieved from the server component. Typically, the watermark itself is not stored in the database, although this is not a limitation. According to one illustrative embodiment of the invention, there are primarily two (2) different types of watermarks. As used herein, an "underlying" or "underlay" watermark is a watermark that is designed to be rendered under information before the information is rendered by printing or display. In contrast, an "overlying" or "overlay" watermark is a watermark that is designed to be rendered on top of or over information after the information is rendered. According to the present invention, once a given printer or display device context has been created and is available for rendering, the client component securely retrieves a watermark definition from the server component, creates a watermark dynamically, and uses local resources (e.g., GDI functions) to write an underlay or overlay watermark. This process will now be described in more detail by reference to the process flow diagram shown in FIG. 2. In this embodiment, a host application 201 is assumed to be executing on an end user client machine having an operating system 203, and the wrapper code 205 has been instantiated. A watermarking server 207 has stored therein a watermark definition and is connectable to the end user client machine, preferably over a secure link. Watermark rendering code 209 is also instantiated in the end user client machine and waits for work.

The process typically begins when a user of the data processing system opens some resource (e.g., a Word document, an Excel spreadsheet, a PowerPoint presentation, or the like) in the host application and initiates a given rendering (e.g., print or display) operation. Any calling application may use the present invention, and the watermark may be applied to any type of document, e.g., a text document, an spreadsheet, a presentation, an email, a document processed in another format (e.g., PDF), or the like. For purposes of the following discussion, the invention is described in the context of a printing operation. In a conventional print operation (i.e. where the client component is not present), the host application calls the StartDoc( ) API function at step 200. Because this API call has been hooked, however, the wrapper code of the present invention is invoked. In particular, the wrapper code intercepts the StartDoc( ) API function call transparently to the host application. In other words, as far as the host application is concerned, the StartDoc( ) API function is proceeding normally. At this point, the server component is contacted, preferably over a secure connection, and a determination is made regarding whether the user has authority to perform a print operation. This is step 202. In the alternative, as noted above, the watermarking server or process may be contacted to obtain the watermark definition when an application (or some plug-in associated therewith) first opens a given document to be rendered. In an enterprise rights management system, the application may need to obtain a decryption key and policy before it can open a given document; in such case, the watermark definition may be provided from the watermarking server process at the same time the application obtains the decryption key and policy, usually from a separate policy server. The determining step may be omitted if the user has already been authorized or authenticated through some other known means or mechanism (e.g., secure logon, user id and password checking, ACL checking, encryption, or the like). If the outcome of any determination is positive, the wrapper code fetches a watermark definition from the server at step 204. As noted above, preferably this data is obtained over a secure connection and is not exposed to the calling application or the end user. The wrapper code then uses the watermark definition to create one or more watermarks, which are then passed to the watermark rendering code at step 206. At step 208, optionally the server is also notified by the wrapper code that the print operation has begun. The server can use this information for auditing or other administrative or management purposes, such as reporting on when a given watermark was supplied to a given document. At step 210, the wrapper code then passes the StartDoc( ) API function call to the operating system kernel. The operating system returns a print job identifier at step 212; thereafter, at step 214, this identifier is then passed back to the calling application. At this point, the semantics of the original StartDoc( ) API function call have been preserved.

The calling application then begins the print job, typically by printing a first page. To this end, the calling application issues a StartPage( ) function call to the operating system kernel. This function call is once again intercepted by the wrapper code, which has hooked the application's native print function. This is step 215. At step 216, the wrapper code forwards the StartPage( ) function call to the operating system kernel. It then increments a page number count at step 218. If the watermark definition retrieved from the server defines an "underlay" watermark, the wrapper code instructs the renderer code to draw the watermark at this time. This is step 220. The renderer code then proceeds to draw what is, in effect, a "custom" watermark, as it is a watermark that has been created for this particular rendering operation. Preferably, the renderer code draws the watermark using the native GDI functions. This is step 222. Thus, for example, the renderer code generates the underlay watermark by passing to the operating system a TextOut( ) function call, which writes a character string at a specified location using a currently selected font, background color and text color, or a BitBlt( ) function call, which performs a bit-block transfer of color data corresponding to a rectangle of pixels, or calling whatever other underlying rendering function is required. The above are merely representative functions, of course. At step 224, after any underlay watermark is rendered, the host application writes the page output, also preferably using the available GDI operating system calls. This page output is written on top of any watermark drawn in step 222.

At step 226, the host application calls an EndPage( ) API function. The wrapper code also intercepts this function call. If the watermark definition retrieved from the server contains an "overlay" watermark, the wrapper instructs the rendering code to print this watermark at step 228. As described above, preferably the watermark renderer code calls the necessary GDI functions to draw the overlay watermark. This is step 230. At step 232, the original EndPage( ) function call is then passed from the wrapper to the operating system kernel to preserve the expected function call semantics. This completes the watermark rendering process.

Thus, as can be seen, the wrapper code hooks into one or more calling application graphic device interface (GDI) function calls to securely retrieve centrally-defined watermark definition data that is then used locally to render a watermark.

Although not described in detail, one of ordinary skill in the art will appreciate that more than one watermark may be laid under or laid over given output information within a given printer or display device context. Of course, a given page may include both an underlay and an overlay watermark. A given watermark may comprise any given information (e.g., text, alphanumeric data, symbols, messages, graphics, images, or combinations thereof). The watermark rendering code may also include logic that applies a given mathematical or other function to given watermark data to create the watermark.

As noted above, the present invention is not limited to dynamic watermarking during a print operation. As noted above, the invention may also be used to provide "on-screen" watermarking during a display operation. To implement on-screen watermarks, the watermarks are applied before (as an underlay) or after (as an overlay) as the calling application writes its output to the display device. This is achieved by hooking an application's WM_PAINT notification message handler. Underlay watermarks are drawn before the WM_PAINT message is passed to the host application; overlay watermarks are drawn after the WM_PAINT message has been processed by the host application.

As noted above, preferably the watermark definitions are stored in a central database, with access thereto being managed by a server component over a secure link. This provides a policy-based watermark solution when the invention is implemented in conjunction with or as part of an enterprise rights management solution. In this manner, neither the end user nor the calling application can easily interfere with the watermark process or tamper with the contents of the watermark itself. Preferably, as noted above, the watermark is maintained in-memory only in the machine that hosts the calling application. The server component, however, preferably receives information from the client component that enables the server to log the watermark created, the watermark creation time, whether the watermark was supplied under or over the rendered output, as well as the printer or display device content in which the watermark was supplied. A given watermark definition on the server may also be changed as a result of the connection that is established between a client computer and the server. In particular, additional "dynamic" information (e.g., user name, password, and/or IP address from which the client connects to the server, or other such information) may be substituted into the watermark definition and logged as necessary.

Thus, according to the centralized policy aspect of the present invention, preferably a system administrator or other authorized entity defines the watermarks that may be rendered dynamically and when and how those watermarks are applied to end user client machines that are connectable to the server. In a representative enterprise rights management environment, watermarks are associated with data classifications, user policies, document policies, policy templates, or site or default policies. In one embodiment, a watermark comprises user-defined text that will appear on a protected document page when it is viewed or printed. In a typical use scenario, an administrator having secure access to the watermarking server creates a watermark definition by defining the watermark text, its color or shade characteristics (gray scale), translucency, as well as its position and orientation, e.g., top or bottom of a page, diagonally across a page, or the like. The watermark definition is then associated with or made a component of a user policy, a site policy, a default policy, or the like.

The watermarking function watermarks a document with information that an authorized entity (e.g., an administrator) specifies in a data structure, referred to herein for convenience as a "watermark definition." Typically, the watermark definition is a text file (or, more generally, a data structure) that contains margin settings, text to watermark, and formatting information for each watermark item. The administrator or other permitted entity can change a sample watermark definition or can create a custom watermark definition. Typically, there is a watermark definition that includes a watermark item for each piece of information to watermark. Thus, a watermark may be represented internally in the system by a watermark definition. The parsing of the watermark text and processing of substitution variables may be based on a native application function. In a representative implementation, there are classes that take over the functionality of parsing a watermark description and formatting of watermarking text. Watermarking may also provide run-time variable substitution of information, such as user name, document ID, server time, and the like. Similarly, conditional logic may be executed to control the content of the watermark, e.g., based on any number of environment conditions such date, time, software version, user or group, network address, or the like. A representative watermark definition is shown in FIG. 3.

Generalizing, a watermark definition contains margin settings and one or more watermarks. For example, it may be desired that a document have the date and time watermarked at the top of its pages and page numbers watermarked at the bottom of its pages. Or, the administrator might want to watermark different information on different page ranges. The information watermarked on the document pages is contained in message blocks. A message block contains the parameters for one piece of information that can be watermarked on one or more pages. A message block begins with the text begin_message on a line by itself. The message block contains required and optional information used to create and position the watermarked information. A message block ends with the text end_message on a separate line. The table in FIG. 4 shows each of the parameters included in a representative message block. In addition, preferably there are a number of variables that can be used to format text to watermark. For example, the user might want to watermark the date and time on document pages. There are several date formats to choose from. These variables let the administrator indicate exactly how he or she wants the date to appear. FIG. 5 is a table showing representative variables for information such as dates, times, and page numbers. Preferably, each variable is case sensitive and has a specific format as indicated.

As noted above, preferably the server includes an administrative GUI or other CLI to enable an authorized entity to create a watermark definition and to apply that definition to a given policy that is enforceable by the enterprise rights management system. In a representative embodiment, the entity obtains authorized or permitted access and opens a watermark definition creation dialog. A display panel identifies existing watermark definitions or affords the user an opportunity to create a new watermark definition. In the latter case, the user identifies the new watermark definition, enters descriptive text, and creates the new definition. Suitable menus and display objects are useful for this purpose, although the particular details of any design GUI or CLI are not material to the present invention. Once the new watermark definition has been created, it is saved in the server database. Of course, there may be many servers and databases, and they may be connected in any convenient manner. In one alternative embodiment, the watermarking server is operated as a managed service that is available online, e.g., on the public Internet, or via a secure intranet.

The following provides additional details of a representative implementation.

Watermark Classes

The following watermark classes preferably are callable from a library and available to a client.

```
class WatermarkItem
{
  public:
    enum Layer {Underlay, Overlay};
    enum Justification {Left, Center, Right};
    enum Position {Top, Bottom, DiagTopLeft, DiagBottomLeft};
    enum TextType {Outline, Filled};
    //
    // Callback to retrieve info about the document for formatText( ).
    // Return false if error encountered or info item not found.
    // This will halt the formatText( ) processing.
    //
    typedef (bool *)DocInfoCallback(string &infoName, string &infoVal,
                void *cbParm);
    WatermarkItem( );
    virtual ~WatermarkItem( );
    void setName(string &name);
    void setText(string &text);
    void setPosition(Position pos);
    void setJustification(Justification just);
    void setStartPage(int startPage);
    void setEndPage(int endPage);
    void setSize(int size);
    void setColor(int color);
    void setTextType(TextType ttype);
    void setLayer(Layer layer);
    string getName(void);
    string getText(void);
    Position getPosition(void);
    Justification getJustification(void);
    TextType getTextType(void);
    Layer getLayer(void);
    int getStartPage(void);
    int getEndPage(void);
    int getSize(void);
    int getColor(void);
    //
    // Translate the watermark variables and replace
    // them with the appropriate values. Passing -1
    // for totalPages inhibits processing of %G.
    // Passing -1 for curPageNum inhibits processing
    // of %g. Passing a null pointer for cb inhibits
    // processing of %i. Passing a null pointer for
    // fileName inhibits processing of %N. Passing a
    // null pointer for filePath inhibits processing of
    // %P. Variables that are not processed are replaced
    // with the empty string.
    //
    bool formatText(int totalPages, int curPageNum,
            DocInfoCallback *cb, void *cbParm,
            string *fileName, string *filePath,
            string &outText);
  private:
    string m__name;
    string m__text;
    Position m__position;
    Justification m__justification;
    TextType m__textType;
    Layer m__layer;
    int m__startPage;
    int m__endPage;
    int m__size;
```

-continued

```
    int m__color;
};
class WatermarkSet
{
  public:
    WatermarkSet(string &data);
    virtual ~WatermarkSet( );
    int getTopMargin(void);
    int getBottomMargin(void);
    int getLeftMargin(void);
    int getRightMargin(void);
    list<WatermarkItem> &getItems(void);
  private:
    list<WatermarkItem> m__items;
    int m__version;
    int m__topMargin;
    int m__bottomMargin;
    int m__leftMargin;
    int m__rightMargin;
};
```

Print Watermarks

As noted above, preferably, the print watermarks are generated by hooking the StartDoc, EndDoc, StartPage, and EndPage Windows API print functions. In StartDoc( ), the code determines if this is a protected document and if its policy includes watermarks. In StartPage( ), the code applies all watermarks whose Underlay setting is Yes. In EndPage( ), the code applies all watermarks whose Underlay setting is No. For watermarks whose Position setting is diag-topleft or diag-bottomleft, the code tiles the watermark text across and down each page and the Justification setting is ignored. Watermarks whose Position is top or bottom appear at the top or bottom, respectively, and their Justification settings are observed. The Outline, StartPage, EndPage, Size, and Color settings preferably are observed for print watermarks. To support outline, the notion of a path is used. In the GDI API, if BeginPath( ) is invoked and then TextOut( ) calls are followed by EndPath( ), the code converts the text into drawn lines. Invoking StrokePath( ) provides the text appearing in outline form; invoking StrokeAndFillPath( ) provides a non-outline form of the text. For non-outline, preferably both the GDI pen and brush are set to the same color.

Diag-topleft watermarks are very straightforward to achieve, e.g., by creating a logical font the baseline of which is at an angle of 45 degrees below the horizontal and to the right. Preferably, the code creates a path from the text with that orientation and determines its bounding rectangle. The code then creates replicant paths using the width and height of the rectangle as the step between starting points of the text in each path.

Diag-bottomleft watermarks are handled similarly to the diag-topleft type, with the logical font having a baseline that is at an angle of 45 degrees above the horizontal and to the right. The main difference in handling the tiling is that the starting points of the text must be the bottom left corner of the bounding rectangle rather than its top left corner.

Preferably, color is interpreted using a formula R=0x FF*color/100 and the same for G and B. This allows the choice of 101 of the 256 shades of grey possible.

The code preferably keeps track of the page count in a StartPage( ) hook; this allows support of a watermark page range as given by the StartPage and EndPage watermark definition settings.

The name and path of the file are available from the document involved.

Routines and Data Structures

The following are illustrative routines and data structures used to print watermarks dynamically according to the present invention.

As described above, these routines are hooked to control printing. The hook calls AllowsPrint( ), which is a routine, internal to this embodiment, that checks the print option for the document. Because the only parameter to EndDoc( ), StartPage( ), and EndPage( ) is an HDC (device context handle), the code keys off that parameter to determine what, if anything, the StartPage( ) and EndPage( ) hooks should do.

The code passes the HDC to AllowsPrint( ) and uses that device handle for registering the print watermark information. The information needed is the HDC, a WatermarkSet, a page counter, and a reference to the document object (alternatively, the function needs to cache built-in document properties, file name, and the file path). The WatermarkSet is the watermark definition, as described above. The class ASOWatermarkPrint contains these data and establishes a global map from the HDC to the ASOWatermarkPrint object for the document being printed.

```
struct ASOWatermarkPrint
{
    // A list of WatermarkSet that came from the server for the
    // "current" document
    list<WatermarkSet> m_wmarks;
    // The current state of the document (contains the file name,
    // path, document properties).
    ASOActiveDocumentState *m_state;
    // Reference to the current document. In this embodiment, the
    // current document is represented using a COM IDispatchPtr
    // (this is how Office documents are represented).
    IDispatchPtr m_theDoc;
    // The total number of pages in the document.
    int m_pageCount;
    // Constructor for ASOWatermarkPrint data structure (initializes
    // fields to their default values).
    ASOWatermarkPrint( );
    // Destructor for ASOWatermarkPrint data structure (destroys
    // allocated memory).
    ~ASOWatermarkPrint( );
    // Applies the watermark to the specified device context
    // (HDC means "handle to device context"). The caller
    // specifies which type of watermarks should be drawn
    // ("overlay" or "underlay") through the "layer" parameter.
    Apply(HDC dc, WatermarkItem::Layer layer);
    // Increments the page number.
    IncrPageNum(void);
    // Retrieves the current page number.
    int PageNum(void);
    // Registers the device context for printing (called from
    // the StartDoc wrapper). This creates a new ASOWatermarkPrint
    // object that can be retrieved using the Lookup method.
    static Register(HDC dc, ASOActiveDocumentState *info,
    IDispatchPtr doc);
    // Unregisters the device context for printing (called from
    // the EndDoc wrapper).
    static Unregister(HDC dc);
    // Locates the ASOWatermarkPrint associated with the specified
    // device context.
    static ASOWatermarkPrint* Lookup(HDC dc);
};
// The map data structure that holds the HDC to ASOWatermarkPrint
// mapping. New ASOWatermarkPrint objects are added to this
// mapping through calls to ASOWatermarkPrint::Register. Objects are
// removed from this mapping through calls to
ASOWatermarkPrint::Unregister.
map<HDC, ASOWatermarkPrint> g_wmarkPrints;
```

Registering the ASOWatermarkPrint object consists of adding an entry to the g_wmarkPrints map. It is at this point that the ASOWatermarkPrint object will be allocated.

```
ASOActiveDocumentState *info = ...
    .
    .
    .
if (bAllowPrint && dc != 0)
{
    ASOWatermarkPrint::Register(dc, info, docPtr);
}
```

StartPage( )

The hook for this routine calls the original StartPage( ) routine and then looks up the ASOWatermarkPrint object using the HDC. If there is an ASOWatermarkPrint object registered for the HDC, the page count is incremented. If the watermark type is underlay and the page count is in range, the watermark is applied.

```
ASOWatermarkPrint *wmark;
// Call the OS StartPage function first.
retVal = s_pfnStartPage(dc);
// Find the ASOWatermarkPrint object that applies (if any).
// This would have been registered in StartDoc.
wmark = ASOWatermarkPrint::Lookup(dc);
if (wmark != 0)
{
    // Increment the page number so the rendering will
    // contain the correct page number.
    wmark->IncrPageNum( );
    // Draw any underlay watermarks to the print device.
    wmark->Apply(dc, WatermarkItem::Underlay);
}
return retVal;
```

EndPage( )

The hook for this routine looks up the ASOWatermarkPrint object using the HDC. If there is an ASOWatermarkPrint object registered for the HDC, the watermark type is overlay and the page count is in range, the watermark is applied. Regardless of the state of watermarking, the original EndPage( ) routine will be called.

```
ASOWatermarkPrint *wmark;
// Find the ASOWatermarkPrint object that applies (if any).
// This would have been registered in StartDoc.
wmark = ASOWatermarkPrint::Lookup(dc);
if (wmark != 0)
{
    // Draw any overlay watermarks to the print device.
    wmark->Apply(dc, WatermarkItem::Overlay);
}
// Call the OS EndPage function now that we're done writing
// the overlay watermark.
retVal = s_pfnEndPage(dc);
return retVal;
```

EndDoc( )

The hook for this routine looks up the ASOWatermarkPrint object using the HDC. If there is an ASOWatermarkPrint object registered for the HDC, the ASOWatermarkPrint object is unregistered, freeing all resources associated with it.

```
// Unregister the ASOWatermarkPrint that was registered in StartDoc.
ASOWatermarkPrint::Unregister(dc);
// Call the OS EndDoc function.
retVal = s_pfnEndDoc(dc);
return retVal;
```

ApplyWatermarks( )

This routine iterates over all WatermarkSet objects to get all WatermarkItems. For each WatermarkItem whose underlay value matches that specified, its text is formatted and emitted via the HDC. The following code illustrates the mechanism.

```
list<WatermarkSet>::iterator i;
// Step through each Watermark that applies (they can come from
// multiple places, so many may apply).
for (i = m_state->w_marks.begin( ); i != m_state->m_wmarks.end( );
i++)
{
    // Each Watermark is made up of 1 or more WatermarkItem objects.
    // Step through each one of these WatermarkItem objects and
    // draw them.
    list<WatermarkItem>::iterator item;
    for (item = i->GetItems( ).begin( ); item != i->GetItems( ).end( );
    item++)
    {
        // If the page is within the range specified in the WatermarkItem
        // and the layer (overlay or underlay) specified in the
        // WatermarkItem matches the value specified by the caller then
        // we will draw the watermark. If either of those conditions
        // is false, then the WatermarkItem object will be skipped.
        if (item->PageInRange(m_pageCount) &&
            item->getLayer( ) == layer)
        {
            int colorVal = 255 * item->getColor( ) / 100;
            COLORREF textColor = RGB(colorVal, colorVal, colorVal);
            int angle;
            int fontHeight;
            string itemText;
            bool fmtGood;
            string fileName;
            string filePath;
            int minX;
            int minY;
            int maxX;
            int maxY;
            int txtWid;
            int txtHgt;
            // Get the file name from the document (this might be
            // needed when rendering the watermark).
            fileName = getFileNameFromDoc(m_doc);
            // Get the file path from the document (this might be
            // needed when rendering the watermark).
            filePath = getFilePathFromDoc(m_doc);
            // Format the text to be displayed (store result in "itemText")
            item->formatText(-1, m_pageCount, getDocProperty,
                this, fileName, filePath, itemText);
            // Determine the angle to use when creating the font. The angle
            // to use depends on the positioning specified in
            // the WatermarkItem.
            if (item->getPosition( ) == WatermarkItem::DiagTopLeft)
            {
                angle = 3150;
            }
            else if (item->getPosition( ) == WatermarkItem::DiagBottomLeft)
            {
                angle = 450;
            }
            else
            {
                angle = 0;
            }
            // Calculate the height of the font (specified in the
            // WatermarkItem).
            fontHeight = pointSizeToLogical(dc, item->getSize( ));
            // Create the font, pen and brush objects needed to render
            // the text.
            font = CreateFont(fontHeight, 0, angle, angle, ...);
            pen = CreatePen(PS_SOLID, penWidth, textColor);
            brush = CreateSolidBrush(textColor);
            // Select the font, pen and brush into the context so they're
            // used by TextOut below.
            oldFont = SelectObject(dc, font);
            oldPen = SelectObject(dc, pen);
            oldBrush = SelectObject(dc, brush);
            // Set the background mode to be "transparent" so the bounding
            // box of the watermark text will be invisible
            // content won't get occluded by the watermark text.
            oldBackgroundMode = SetBkMode(dc, TRANSPARENT);
            // Determine the size of the bounding box.
            BeginPath(dc);
            status = TextOut(dc, 0, 0, itemText.c_str( ), itemText.size( ));
            EndPath(dc);
            textRegion = PathToRegion(dc);
            GetRgnBox(textRegion, &textRect);
            txtWid = textRect.right - textRect.left;
            txtHgt = textRect.bottom - textRect.top;
            //
            // Emit the watermark
            //
            if (angle == 0)
            {
                //
                // Observe justification and don't tile.
                //
                if (item->getPosition( ) == WatermarkItem::Top)
                {
                    minY = i->getTopMargin( );
                }
                else
                {
                    minY = pageHeight - i->getBottomMargin( ) - txtHgt;
                }
                if (item->getJustification( ) == WatermarkItem::Left)
                {
                    minX = i->getLeftMargin( );
                }
                else
                {
                    minX = pageWidth - i->getRightMargin( ) - txtWid;
                    if (item->getJustification( ) == WatermarkItem::Center)
                    {
                        minX /= 2;
                    }
                }
                BeginPath(dc);
                status = TextOut(dc, minX, minY, itemText.c_str( ),
                    itemText.size( ));
                EndPath(dc);
                if (item->getTextType( ) == WatermarkItem::Outline)
                {
                    StrokePath(dc);
                }
                else
                {
                    StrokeAndFillPath(dc);
                }
            }
            else
            {
                // Tile and ignore justification.
                minX = i->getLeftMargin( );
                maxX = pageWidth - i->getRightMargin( );
                minY = i->getTopMargin( );
                maxY = pageHeight - i->getBottomMargin( );
                for (eks = minX; eks < maxX; eks += (textRect.right -
                textRect.left))
                {
                    for (why = minY; why < maxY; why += (textRect.bottom -
                    textRect.top))
                    {
                        BeginPath(dc);
                        status = TextOut(dc, eks, why, itemText.c_str( ),
                            itemText.size( ));
                        EndPath(dc);
```

-continued

```
            if (item->getTextType( ) == WatermarkItem::Outline)
            {
                StrokePath(dc);
            }
            else
            {
                StrokeAndFillPath(dc);
            }
        }
       }
      }
     }
    }
}
```

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. As has been described, a given implementation of the present invention is software written in a given programming language that runs on a server on a standard Intel hardware platform running an operating system such as Microsoft Windows.

While given components of the system have been described separately, one of ordinary skill will appreciate that some of the functions may be combined or shared in given instructions, program sequences, code portions, and the like.

As noted above, in many circumstances it will be desirable to have a watermark definition securely provided to the end user client machine and maintained (preferably in-memory only) prior to a given rendering operation. In particular, where the watermarking process is ancillary to or used in conjunction with an enterprise rights management system, it is useful to have the watermark definition provided substantially concurrently with the providing (usually to an application plug-in) of a decryption key and policy associated with a protected document that will be watermarked. Indeed, if the watermarking server or server process is co-located with or part of an ERM policy server, the watermark definition can be provided to the calling application together with the decryption key and policy over the same secure link. In this embodiment, the wrapper and rendering code may be part of the application plug-in that enables access to and use of the protected document. As used herein, a "protected document" should be broadly construed to cover any "object" (e.g., a Word document, an Excel spreadsheet, an email, a PowerPoint presentation, an email attachment, a PDF document, or any other, irrespective of format). Also, a "document" may refer to a given portion thereof.

Stated another way, according to the invention, the watermark definition may be retrieved from the server either before or after a given device context (to render a given document) is initiated by a calling application.

Also, the invention may be implemented irrespective of whether the end user client machine has a dedicated graphics device interface (such as Microsoft Windows GDI); rather, the wrapper code may hook into any convenient interface or API across which one or more rendering function calls to the operating system are carried out.

Having described our invention, what we now claim is as follows.

We claim:

1. A method for rendering a watermark on a client computer having an operating system and an interface including a set of one or more rendering functions that are called by a calling application executed on the client computer, the method comprising:

upon initiation of a given device context defined by a rendering function, intercepting a call to the rendering function by the calling application through a respective application program interface (API) function; and transparently to the calling application, calling the rendering function through the respective API function upon execution of the calling application to render the watermark on the client computer in conjunction with information output by the calling application, the watermark being rendered from data received from a server computer wherein the data includes an associated set of one or more definitions created by an authorized entity, and wherein the one or more watermark definitions is changed as a result of the network connection established between the client computer and the server computer.

2. The method of claim 1 wherein the watermark is rendered under given the information output by the calling application as an underlay watermark by rendering the watermark before the calling application writes its output to the client computer.

3. The method of claim 1 wherein the watermark is rendered over given the information output by the calling application as an overlay watermark by rendering the watermark after the calling application writes its output to the client computer.

4. The method of claim 1 wherein the data associated with the watermark is associated with a use policy defined by the administrator of the server, and is transmitted to the client on an as-needed basis in accordance with the use policy.

5. The method of claim 4 wherein the server is connected to the data processing system over a secure link within the network, and is an enterprise rights management server that implements a digital rights management program.

6. The method of claim 1 wherein the rendering function call defines a given device context call from the calling application and is one of a call to print output the information or a call to display output the information.

7. The method of claim 1 wherein the operating system is Windows and the interface is Windows graphic device interface (GDI).

8. The method of claim 1, wherein the data associated with the watermark is not exposed to the calling application.

9. The method of claim 1 wherein the data associated with the watermark includes conditional logic that is executed to facilitate rendering of the watermark.

10. An enterprise rights management system, comprising:
a client computer including executable code for selectively calling a rendering function from a calling application executed on the client computer, intercepting the rendering function call generated by the calling function transparently to the calling application and accessing the rendering function through a respective application programming interface (API) function to render a watermark from data associated with the watermark received from a server computer, wherein the data includes an associated set of one or more watermark definitions created by an authorized entity, and wherein the one or more watermark definitions is changed as a result of the network connection established between the client computer and the server computer.

11. The enterprise rights management system of claim 10, wherein the watermark is an underlay watermark adapted to be rendered under given information output by the calling application.

12. The enterprise rights management of claim 10, wherein the watermark is an overlay watermark adapted to be rendered over given information output by the calling application.

13. The enterprise rights management system of claim 10 wherein the client computer connects to the server computer over a secure link within the network, and is an enterprise rights management server that implements a digital rights management program.

14. The enterprise rights management system of claim 10 wherein the client computer connects to the server computer in response to a document to be watermarked is first being accessed in the enterprise rights management system.

15. A non-transitory computer usable medium having computer readable program code embodied therein, the computer readable program code adapted to be executed to implement a method for applying a watermark to information output by a calling application in a client computer having an operating system and an interface including a set of one or more rendering functions that can be called by the calling application to render the information, the method comprising:

retrieving data associated with a watermark from a server coupled to the client computer, the data including one or more watermark definitions created by an authorized entity;

intercepting a call from the calling application to at least one of the set of one or more rendering functions to render the information output by the calling application; and calling at least one of the set of one or more rendering functions through respective application programming interface (API) functions upon execution of a calling application executed on the client to render the watermark on the client computer, wherein the one or more watermark definitions is changed as a result of the network connection established between the client computer and the server computer.

16. The non-transitory computer usable medium of claim 15, wherein the rendering function call from the calling application is a call to print the information or a call to display the information.

17. The non-transitory computer usable medium of claim 15, wherein the data associated with the watermark includes at least one substitution variable that is substituted to facilitate rendering of the watermark, and wherein the watermark definition is changed as a result of the network connection established between the client computer and the server computer.

18. The non-transitory computer usable medium of claim 15, wherein the data associated with the watermark includes conditional logic that is executed to facilitate rendering of the watermark.

19. The non-transitory computer usable medium of claim 15, wherein the data associated with the watermark is not exposed to the calling application.

20. The non-transitory computer usable medium of claim 15, wherein the method is performed by an enterprise rights management system that manages access to the information.

21. The non-transitory computer usable medium of claim 15, wherein the watermark is one of an overlay watermark or underlay watermark depending on the order of writing of the watermark data in relation to the calling application output.

* * * * *